United States Patent [19]

Umemoto et al.

[11] 4,325,574

[45] Apr. 20, 1982

[54] SHOCK ABSORBING BUMPER OF A VEHICLE

[75] Inventors: Yoshiro Umemoto, Nagoya; Yasuhiro Mishima; Shuichiro Takao, both of Toyota; Kazunori Sawada, Aichi; Nobuo Kobayashi, Okazaki, all of Japan

[73] Assignee: Toyota Jidosho Kogyo Kabushiki Kaisha, Toyota, Japan

[21] Appl. No.: 165,216

[22] Filed: Jul. 1, 1980

[30] Foreign Application Priority Data

Sep. 26, 1979 [JP] Japan .......................... 54-131973[U]

[51] Int. Cl.³ .............................................. B60R 19/02
[52] U.S. Cl. .................................................... 293/120
[58] Field of Search ....................... 293/120, 121, 136

[56] References Cited

U.S. PATENT DOCUMENTS

| 3,013,919 | 12/1961 | Bioly | 296/121 |
| 3,842,565 | 10/1974 | Brown et al. | 293/120 |
| 3,897,967 | 8/1975 | Barenyi | 296/120 |

Primary Examiner—Robert R. Song
Attorney, Agent, or Firm—Browdy and Neimark

[57] ABSTRACT

A shock absorbing bumper adaptable for mounting onto the front and rear of a vehicle such as an automobile, the bumper comprising an elastic external member having sheathed therein a flexible core material and a decorative facing base provided on the front side of the external member. An elastic facing base having formed on its front side the elastic decorative facing is provided on its rear side with a plurality of hooks which fit into the corresponding holes formed in bottom portion of the recession of the external member and are engaged therein in such a way that they overhang their undercuts towards at least three ways to the edge of said corresponding holes.

7 Claims, 7 Drawing Figures

U.S. Patent   Apr. 20, 1982   4,325,574
Fig.1 PRIOR ART
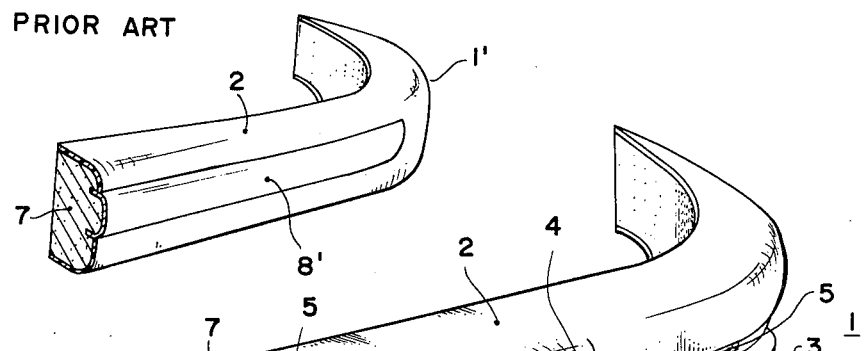
Fig.2
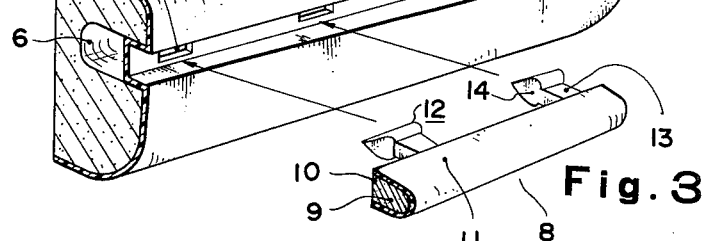
Fig.3
Fig.4
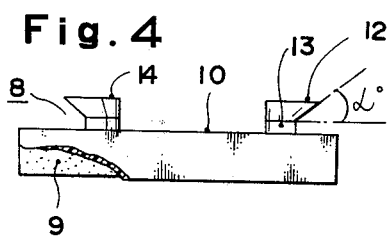
Fig.6
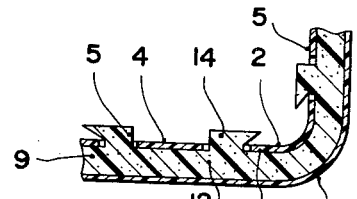
Fig.5
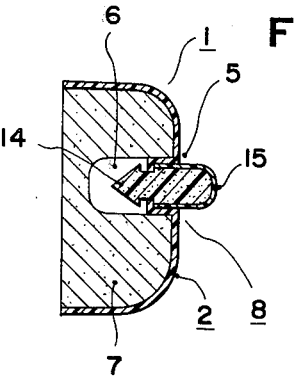
Fig.7
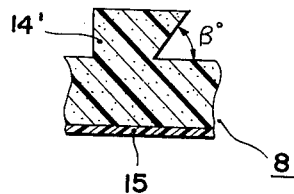

SHOCK ABSORBING BUMPER OF A VEHICLE

FIELD OF THE INVENTION

This invention relates to a shock absorbing elastic bumper adaptable for mounting onto the front and rear of a vehicle.

BACKGROUND OF THE INVENTION

As is well known, vehicles such as automobiles are normally mounted with a bumper designed to attenuate the shock of collision, but most of the conventional bumpers are made of a metal material with metallic plating, so that these bumpers, although looking nice in appearance, have the problem of shock absorption.

Recently, in overcoming the diversified requirements and regulations such as elevated safety standards due to the increase of traffic volume and speed, fuel economization by weight-saving, etc., elastic shock absorbing bumpers made of elastomeric material such as urethane elastomer have been devised which maintain the shock absorbing performance of the bumper at low speed collision at, say, 5 mile/hr.

Such an elastic bumper, although excellent in shock absorptivity, still has the problem of poor outward appearance in comparison with conventional metal bumper. An answer to this problem is, as illustrated in FIG. 1, the integral provision of a decorative metalic facing base 8' such as SUS on the surface portion of the external member 2 of elastic bumper 1', which has an elastic core 7. However, because of very limited elastic capacity between the metal facing base 8' and the external member 2, such facings, in the event of collision, cannot follow the same process of elastic deformation and shock absorption as the bumper, and may suffer plastic deformation with the result that the decorative design of the facing is damaged or peeled off by only one initial collision.

SUMMARY OF THE INVENTION

The first object of this invention is to eliminate the problems inherent to the conventional elastic bumper devices, and the second object of this invention is to provide an improved shock absorbing bumper structure in which the elastic facing base, having a wide range of elasticity, is fixed in position in holes in the external member by means of the overhanging engagement of hooks having at least three undercuts provided on the rear side of the facing base interengaging with the corresponding holes of said external member thereby to vest the facing base with the ability to return to its shape with the external member and to allow easy incorporation of such facing base.

In order to accomplish these objects, there is provided according to this invention an improved manner for incorporating the decorative facing base onto an elastic bumper according to which the rim of the elastic facing base which is provided on its surface with the elastic decorative facing, is secured into recession formed in the front surface of the external bumper member while the hooks having at least three direction of undercut on the rear side of said facing base are inserted into the corresponding holes formed in the external member so that said hooks will overhang the edges of said holes to thereby fix the facing base in position on the external bumper member whereby in the event of collision, the striking energy is absorbed by both the external elastic member and the internal flexible core member therein while the elastic facing base, which is fixed to the external bumper member, undergoes integral elastic deformation and can return to its original shape with both bumper members without being damaged in its aesthetic appearance or being peeled off.

BRIEF DESCRIPTION OF THE DRAWINGS

FIG. 1 is a partial perspective view of an prior art of an elastic bumper;

FIG. 2 is a partial perspective view of an elastic external member of the invention;

FIG. 3 is a partial perspective view of an elastic facing base;

FIG. 4 is a partial sectional plain view of an elastic facing base;

FIG. 5 is a sectional view of shock absorbing bumper according to this invention;

FIG. 6 is a sectional view of a elastic facing base fixed to external bumper member;

FIG. 7 is an enlarged sectional view of a facing base of another embodiment.

DESCRIPTION OF THE PREFERRED EMBODIMENTS

Referring to FIGS. 2 to 6, 1 is a shock absorbing bumper which shows a first embodiment of this invention and is provided with a retainer for connection with the front and/or rear of a vehicle, numeral 2 designates an elastic external member made of an urethane elastomer.

The external member is U-shaped in cross-section and has formed in its front portion a horizontal recess 3 with a predetermined width, depth and length. In the recess 3 are formed a plurality of holes 5,5 of a predetermined size, the holes being arranged at fixed intervals and in opposed relationship along the upper and lower edges and somewhat extending into the bottom portion 4 of the recess 3.

And a separately molded U-sectioned flexible urethane foam core member 7 is fitted in the external member 2 as shown to thereby complete a shock absorbing bumper 1.

The elastic facing base 8 is made of an urethane elastomer and has U-shaped section.

The facing base 8 is provided with plural hooks 12,12 on its backside corresponding to said holes 5,5 of recess 3 and its rear face and both upper and lower rims are securly and tightly attached to the recess 3 of said external member 2.

In the embodiment, said hook 12 has a straight neck portion 13 corresponding to the depth of said hole 5 which has undercuts 14,14 therewith by angle α° there to.

And yet, the undercuts of arrow shaped in section 14,14 are designed in three ways, either lateral edges and both upper and lower edges to fit therein of the hole 5, especially in need at the corner portion as shown in FIG. 6.

As to said undercut angle α°, it is suitably 30°∼70° degrees, but is preferably 45°.

Attached integrally to the outer side of the elastic facing base 8 by double-coated tapes or other means is an elastic decorative facing 15 having a metallic luster which can be made, for example, from an aluminized transparent PVC film.

For securing the facing base 8 in position on the elastic external member 2, first the upper and lower rims of the former are fitted into the corresponding recess 3 in the latter and the hooks 12,12 on the back side of the facing base 8 are pressed into the corresponding holes 5,5 whereby each hole 5 is spread out sidewardly and upwardly and downwardly by the undercut portions 14,14 of the corresponding hook 12 owing to elasticity provided by the angle $\alpha°$, and when the undercuts portion 14,14 are placed in the hole 5, the very hole 5 returns to its original form by spring-back and the hook 12 is securely held by the edges of hole 5 and pressure of recess 3 as shown in FIGS. 5 and 6.

More specifically, in the process of forced insertion of each hook 12 of the facing base 8 into the corresponding hole 5 in the recession 3, the hole 5 is first spread out owing to its elasticity to the full width of the hook 12 and upon insertion, the hole 5 is brought into a condition where the neck portion 13 of the hook 12 is engaged with the edges of the hole 5 as shown in FIGS. 5 and 6, and such engagement is further ensured by the spring action of the U-shaped core member 7.

Then, a vehicle mounted with above mentioned shock absorbing bumper 1 is in sufficient aesthetic form with said facing base 8, especially with said elastic decorative facing 15.

In the event of collision, the striking energy is absorbed by the elastic external member 2 and the core member 7, and both members undergo an elastic deformation and immediately restore to their original shapes in short time.

In that process, said elastic facing base 8, which is integrally secured to the recess 3 of said external member 2, is also integrally deformed therewith without peeling off and restores to its original shape.

But the deformation between the external member 2 and the facing base 8 is not always same degree.

Therefore, generally speaking in case of the latter deformation not being the same as that of the former, some portion of the deformation, especially portions of corner, hook 12 is apt to peel off from the corresponding hole 5.

In the present invention, however, said undercuts 14,14 of hook 12 extend in at least three directions to prevent the hook 12 itself from peeling off from the hole 5, even if both upper and lower edges of undercuts 14,14 are slipped out partially, the lateral edges of undercut 14 are still fixed to the hole 5 so as to maintain the engagement of the facing base 8 to the external member 2.

After striking energy is absorbed to restore the shock absorbing bumper, the undercuts in all ways return in spring-back action with that of external member 2 and the decorative facing 15 provided on the surface of the elastic facing base 8 is also accordingly restored to its original shape after the pattern of the facing base 8, so that the aesthetic effect of the decorative facing 15 remains unchanged.

Above mentioned operation is effective in case of the complex deformation which arises in the corner portion so as to prevent partial peeling off of the facing base 8 from the corner of the external member 2.

And the smaller the width and the radius of the corner of said facing base 8, the more effective in the protection.

It will be readily understood that this invention is not limited to the above-described embodiment but may be embodied in various other forms. For instance, the elastic facing base may not necessarily be provided to the front portion of the external bumper member but may be provided to its top face or corners on both sides.

The decorative facing 15 may of course be provided by employing other means such as vacuum deposition, dry spattering, etc. of using the film, instead of said illustrated embodiment.

And as to hook 12, as shown in FIG. 7, it is possible to provide undercut 14' without stem portion to the back side of the elastic member 9 of facing base 8' directly.

In the embodiment the angle is changeable in plans.

Hole 5 is not generally limited square type, and undercut 14 is able to be planed to be shaped in four or five ways.

As undercuts 14 of hook 12 extending in several directions are better for protection against peeling off, for instance three ways undercuts 14 are preferred in accordance with several conditions.

As described above, there is provided according to this invention, an improved shock absorbing bumper of a vehicle comprising an elastic external member, provided with a flexible core member there inside, having formed in its front part a horizontal recess and a row of holes centrally therein, an elastic facing base provided on its front side with an elastic decorative facing and centrally on its back side with hooks for fixing said facing base to said external member by its undercuts extending in at least three directions to corresponding holes of said external member. Thus, basically both the elastic facing base and the elastic external member though molded separately from each other can be simply assembled together very efficiently as the hook and hole engagement as well as rim of the facing base and recess engagement can be achieved by a single operation with ease by their elasticity. Further, since the hooks are engaged with the edges of the corresponding holes by making use of their undercut's spring-back, there is eliminated any risk of accidental removal of the facing.

Thus, according to the present invention, when an impact force is exerted thereto as in the event of collision, the resultantly produced striking energy is absorbed by the elastic external member and flexible core member and both members can soon elastically restore to their original forms. While the elastic facing base does not always follow the completely same pattern of deformation and restoration through the difference of elasticity range, the facing base, especically portion of corner of elastic bumper and in narrow width shape, ocasional drops by peeling off of the hook from the corresponding hole, when complex striking power is applied to the same upper and lower portion or frontwards and rearwards of both side of the facing base.

But in the invention, the hook of the facing base is provided with undercuts in at least three directions to be engaged with corresponding holes of the recess of the external member.

Even if one or two of the undercuts, therefore, come out from the holes, at least one undercut will remain engaged with the edge of the hole prevent the facing base from peeling off from the external member by spring back after absorbing striking energy and a re-engagement between another hooks and corresponding holes will then occur.

Then the shock-absorbing member is restored to its original shape together with elastic decorative facing to maintain it aesthetic design effect.

What is claimed is:

1. A shock absorbing bumper of a vehicle, comprising:
   a flexible, elastic compressible core member having a front side and a rear side, and an elongated horizontal groove extending along the front side of said core member along the length thereof;
   an elastic external member overlying the front side of said core member and shaped to provide an elongated horizontal recess overlying said horizontal groove of said core member, said external member having a series of holes passing therethrough spaced along the length of said horizontal recess; and
   an elastic facing base having a rear wall and a front wall and shaped so that its said rear wall fits within said horizontal recess while its said front wall projects therefrom, said front wall carrying a decorative facing and said rear wall carrying a plurality of hooks interengaging with the holes of said horizontal recess, each of said hooks being provided with undercuts extending in at least three different directions.

2. A shock absorbing bumper of a vehicle according to claim 1, wherein said hooks are arrow-shaped in section and molded integral with said facing base.

3. A shock absorbing bumper of a vehicle according to claim 1, wherein said recess is curved backwardly on the corner portion of said external member where said elastic facing base is engaged by a hook to a corresponding hole.

4. A shock absorbing bumper of a vehicle according claim 1, wherein the angle of said undercut side to the back side of said facing base is about 30°~70°.

5. A shock absorbing bumper of a vehicle according claim 1, wherein said undercut is molded directly from the back side of said facing base.

6. A shock absorbing bumper according to claim 1, wherein said undercuts of said hooks extend laterally and upwardly and downwardly to engage at least three edges of each respective hole.

7. A shock absorbing bumper for a motor vehicle, comprising:
   a flexible, polyurethane foam core member having a front side and a rear side, and an elongated horizontal groove extending along the front side of said core member along the length thereof;
   an elastomeric external sheet member overlying the front side of said core member and shaped to provide an elongated horizontal recess overlying said horizontal groove of said core member with the bottom of said recess being spaced from the bottom of said groove, said elastomeric external sheet member having a series of holes passing therethrough spaced along the length of said horizontal recess; and
   an elastic facing base formed of urethane elastomer and having a rear wall and a front wall, said elastic facing base being shaped so that its rear wall fits within said horizontal recess while its front wall projects therefrom, said front wall carrying a decorative facing and said rear wall carrying a plurality of hooks interengaging with the holes of said horizontal recess, each of said hooks being provided with undercuts extending in at least three different directions;
   said shock absorbing bumper being curved at its two ends with said groove, said recess and said elastic facing base being curved along with said core member, and at least one of said plurality of hooks interengaging with a corresponding hole being located along each of said curved portions.

* * * * *